United States Patent [19]

Clark

[11] 4,251,192
[45] Feb. 17, 1981

[54] ROTARY PUMP WITH SYMMETRICAL BY-PASS AND ROTOR WITH RESILIENTLY MOUNTED VANES

[76] Inventor: Alonzo R. Clark, R.R. 2, Stryker, Ohio 43557

[21] Appl. No.: 967,279

[22] Filed: Dec. 7, 1978

[51] Int. Cl.³ .............................................. F04B 49/08
[52] U.S. Cl. .................................. 417/291; 417/311; 417/310; 418/266
[58] Field of Search ................ 417/310, 311; 137/569; 277/93 R; 418/266; 410/291

[56] References Cited

U.S. PATENT DOCUMENTS

| | | | |
|---|---|---|---|
| 542,920 | 7/1895 | Berry | 418/266 |
| 722,185 | 3/1903 | Robinson | 418/266 |
| 1,496,291 | 6/1924 | Beckwith | 417/310 X |
| 2,423,436 | 7/1947 | Blom | 277/93 X |
| 2,586,147 | 2/1952 | Caserta | 417/310 |
| 3,076,414 | 2/1963 | Adams | 418/266 X |
| 3,188,096 | 6/1965 | Wilkinson | 277/93 X |
| 3,655,206 | 4/1972 | Adams | 277/93 R X |
| 3,724,972 | 4/1973 | Guetersloh | 417/310 X |

FOREIGN PATENT DOCUMENTS

| | | | |
|---|---|---|---|
| 508380 | 7/1920 | France | 417/310 |
| 1115129 | 12/1955 | France | 417/310 |

Primary Examiner—Richard E. Gluck
Attorney, Agent, or Firm—Allen D. Gutchess, Jr.

[57] ABSTRACT

A rotary pump for pumping liquids is provided. The pump is compact with a bypass system built into the pump housing. The pump is symmetrical about a center line so it can pump liquids in opposite directions simply by reversing the rotation of the drive shaft and without making any changes in the pump itself. The bypass also is designed to open equally with liquids flowing in either direction. The pump has self-lubricating vanes or blades which are designed so that the liquid being pumped can move behind the blades and urge them outwardly against the pump chamber wall, with the liquid also helping to lubricate the blades. The pump also has improved mechanical seals and bearings for the drive shaft.

11 Claims, 3 Drawing Figures

ROTARY PUMP WITH SYMMETRICAL BY-PASS AND ROTOR WITH RESILIENTLY MOUNTED VANES

The invention relates to rotary pumps designed particularly for pumping liquids.

A pump in accordance with the invention is compact in design and has a high throughput, particularly for its size, as compared with pumps now on the market. The pump housing has a bypass system built in to also maintain the overall pump small in size. Both the pump and the bypass are designed to move liquids in either direction without changing any components of the pump at all, this being achieved simply by reversing the drive shaft rotation. A spring-loaded valve in the bypass system is symmetrically designed to open at the same pressure regardless of the direction of the flow of the liquid being pumped.

The pump has self-lubricating vanes or blades of a slippery plastic material which are located in grooves in a rotor, with the blades having side recesses by means of which liquid being pumped can flow behind the blades to help urge them outwardly against the pump chamber walls during rotation. The liquid being behind the blades and along the side walls thereof also helps lubricate the blade. Further, the pump is relatively maintenance free and all moving parts are easily replaceable.

The new pump also is equipped with improved seals and bearings for the drive shaft. Even with liquids at high pressures, leaking is substantially zero by a unique design of plastic sealing blocks located around the drive shaft.

It is, therefore, a principal object of the invention to provide an improved rotary pump having the features and advantages described above.

Many other objects and advantages of the invention will be apparent from the following detailed description of a preferred embodiment thereof, reference being made to the accompanying drawings, in which.

Figure 1:
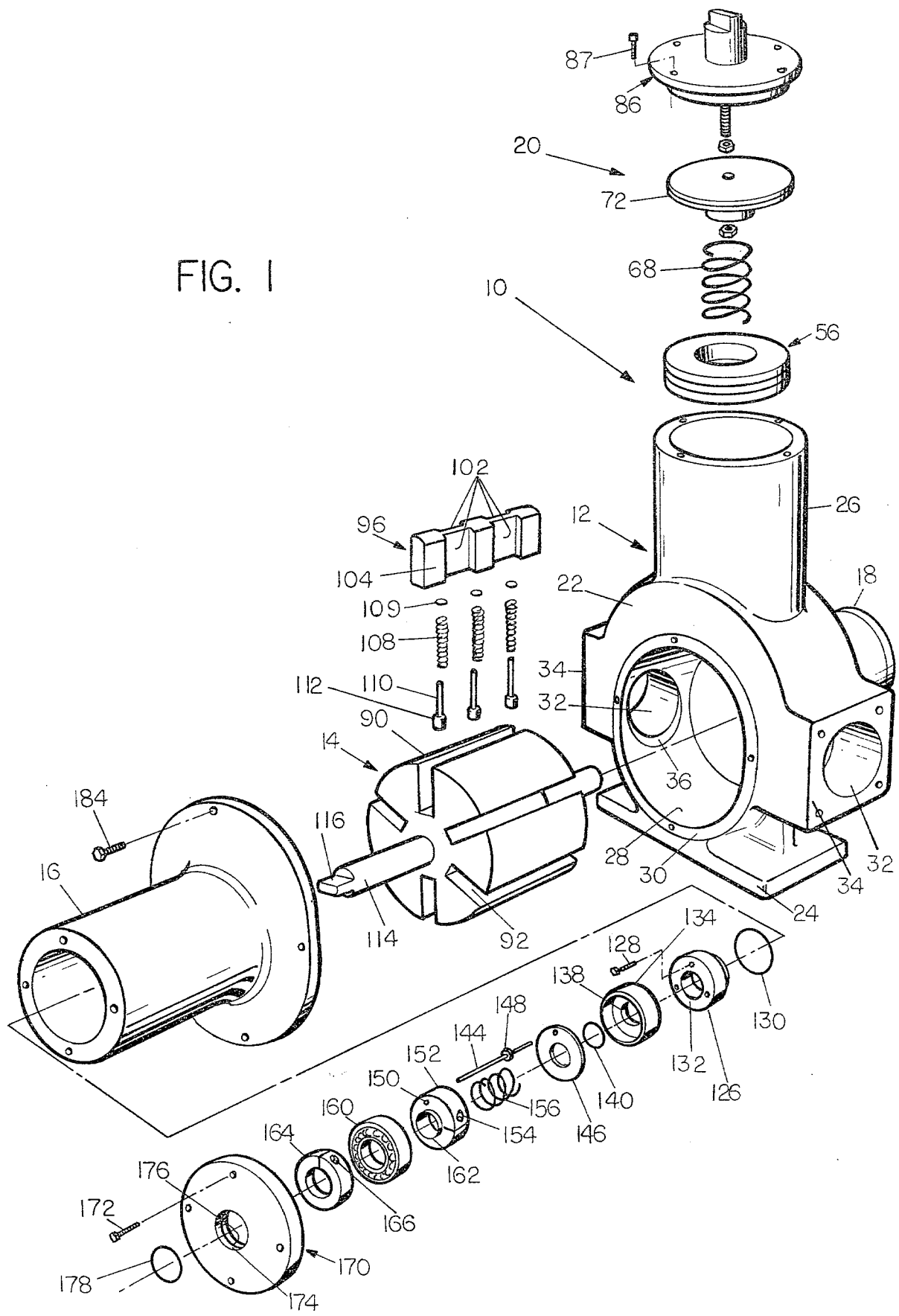
FIG. 1 is an exploded view in perspective of a rotary pump in accordance with the invention.

Referring to the drawings, a pump according to the invention is indicated at 10 and includes a housing 12, a rotor assembly 14, bearing supports 16 and 18, and a bypass valve assembly 20.

The housing 12 is symmetrical about vertical planes which are parallel and perpendicular to the axis of rotation of the rotor assembly. The housing 12 also is preferably made of aluminum which is less than half the weight of a cast iron housing and will not rust. The appropriate surfaces of the aluminum housing are heat-treated and hard anodized for longer wear.

The housing includes a rounded central portion 22 with a flanged base 24 and an upwardly-extending cylindrical projection 26. A central, elliptical pump chamber 28 is formed in the rounded portion 22 of the housing 12, extending completely therethrough and terminating at the surfaces in annular flanges 30. Liquid passages 32 communicate with the chamber 28 above the center thereof and extend outwardly to planar faces 34 having suitable tapped openings 36. These faces receive flanges of liquid pipes or hoses through which the liquid being pumped flows. Where the passages 32 communicate with the walls of the cylindrical chamber 28, chamfered or beveled surfaces 36 are formed. These beveled surfaces have a maximum area at the lower portions of the passages 32 and diminish to sharp edges above the centers of the passages. The lower beveled surfaces provide greater area for flow of liquid into the pumping chamber while the sharper upper edges achieve efficient pickup of the liquid from the passages by the rotor. About one-fourth of the upper edges of the passages 32 at the chamber wall are sharp where the beveled surface has diminished to zero.

Symmetrical bypass passages 38 communicate with the passages 32 near their openings into the pump chamber and extend upwardly to a vertical cylindrical chamber 40 in the cylindrical projection 26. With the bypass passages 38 built into the housing 12, the overall pump is more compact and there are no awkwardly extending bypass pipes which can be a nuisance as well as take up additional space. Such pipes are also subject to possible damage and leaking.

A generally inverted V-shaped portion 42 of the housing 12 separates the bypass passages 38 and has a generally semi-cylindrical groove 44 at its apex. The groove 44 receives a valve seat rod 46 having a narrow, upper flat surface 48 forming a valve seat for the bypass valve assembly 20. The inner end of the valve seat rod 46 extend into a shallow recess 50 (FIG. 2) at one side of the cylindrical projection 26 with the valve seat rod 46 inserted through an opening 52 on the opposite side of the projection 26, where it is held in place by a threaded fitting 54.

The valve assembly 20 includes a piston-shaped valve 56 having a cylindrical surface 58 with annular grooves 60 containing O-rings 62. The valve 56 also has a lower flat surface 64 which bears against the flat surface 48 of the valve seat rod 46. This forms a liquid-tight seal between both of the bypass passages 38 under normal operating conditions of the pump 10. The valve 56 has a central recess 66 which receives the end of a pressure spring 68 urging the valve against the valve seat. The upper end of the pressure spring 68 fits around a cylindrical projection 70 of an adjusting body 72 which also has an outer surface 74 forming an annular groove 76 for an O-ring 78. This provides an additional seal for the valve assembly against leakage. The body 72 has a central bore 80 through which a threaded adjusting rod 82 extends, being affixed to the body 72 by lock nuts 84 above and below the body 72. The adjusting rod 82 extends through a tapped passage 85 in an upper cap 86 so as to move the adjusting body 72 up and down when the rod is turned. The cap is affixed to the upper end of the housing projection 26 by cap screws 87, and an upper lock nut 88 holds the adjusting rod 82 in position.

When the adjusting body 72 is moved downwardly, the compressive force of the spring 68 on the valve 56 is increased so that a higher pressure of the liquid in the passages 38 is required to unseat the valve from the valve body 46. When the body 72 is moved in the opposite direction, the opposite occurs. The exposed surface of the valve 56 on each side of the valve seat rod 46 is the same so that the same liquid pressure will open the bypass valve regardless of which direction of flow occurs in the pump housing 12.

Figure 3:
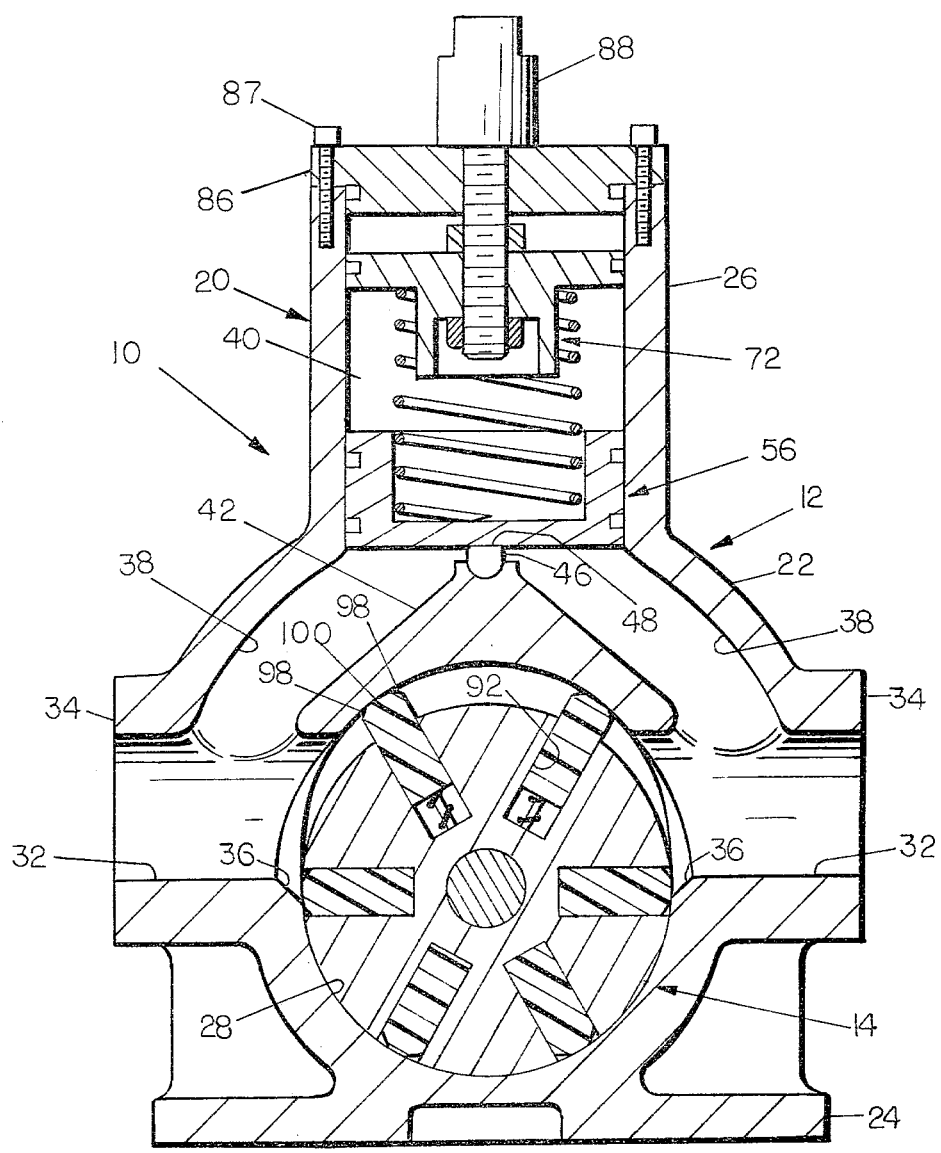
FIG. 3 is a view in vertical cross section taken along the line 3—3 of FIG. 2.

The rotor assembly 14 includes a generally cylindrical rotor 90 which has a length slightly less than the depth of the pump chamber 28. The body 90 has a plurality of radially-extending grooves 92 which extend the length of the rotor and have a depth exceeding one-half but not exceeding three-fourths of the radius of the rotor. The bottoms of the grooves also have a plurality, in this case three, short cylindrical recesses 94 therein. A vane or blade 96, preferably of slippery plastic, such as Delrin, is located in each of the grooves 92 and projects outwardly therefrom at varying distances during rotation of the rotor. There are six vanes shown, the number being sufficient to have two blades contacting the upper chamber wall between the passages 32, in a preferred form. The outer edge of each of the vanes 96 is of truncated triangular shape, as best seen in FIG. 3, with slanted outer surfaces 98 and a flat surface 100 therebetween. Each of the vanes also has two shallow grooves 102 on each side thereof. The grooves 102 enable the liquid being pumped to move down between the shallow grooves 102 and the side walls of the grooves 92 behind the blades 96 where the liquid, under pressure, can urge the vanes 96 outwardly against the wall of the chamber 28. This liquid further can serve as lubricant for the vanes as they move in and out of the grooves during rotation of the rotor.

Thicker portions 104 of the vanes, at the ends and in a central portion thereof between the shallow grooves 102, have cylindrical recesses 106 (FIG. 2) which extend more than one-half but not more than three-fourths the widths of the vanes. Coiled springs 108 seat against metal washers 109 in the bottoms of the recesses 106 and also in the bottoms of the recesses 94 in the rotor grooves. These are prevented from kinking or snaking by rods 110 extending partly through the springs and having enlarged heads 112 between the ends of the recesses 94 and the corresponding ends of the springs 108.

A drive shaft 114 extends through the rotor 14 and is suitably affixed therein, for example, by three drive pins therethrough which extend from the bottoms of the grooves 92. The drive shaft preferably is of stainless steel to reduce chemical attack by the liquid being pumped. The drive shaft 114 also has a suitable noncircular end 116 (FIG. 1) by means of which it can be connected to a suitable drive unit (not shown).

Figure 2:
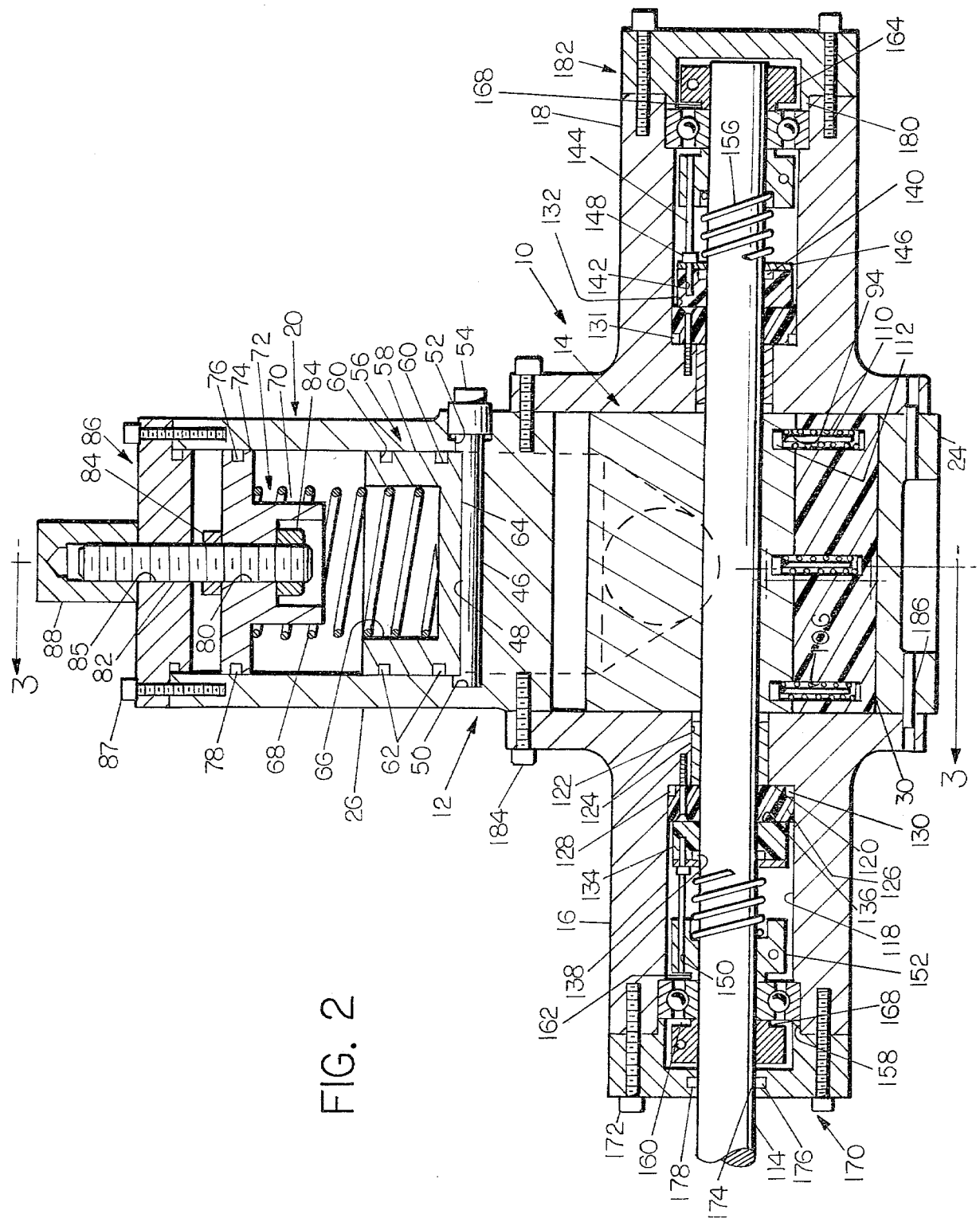
FIG. 2 is a view in vertical cross section taken through the pump of FIG. 1, in a plane perpendicular to the drive shaft.

The sealing and bearing means in the supports 16 and 18 are substantially identical and the components in one support, as shown in section in FIG. 2 and in exploded perspective in FIG. 1, will be discussed in detail. The support forms a cylindrical chamber 118 having an annular end wall 120 spaced from the pump chamber 28 with a cylindrical bore 122 extending between the pump chamber 28 and the chamber 118. A brass sleeve bearing 124 is located in the bore 122 and supports the drive shaft 114 immediately outside the pump chamber. A cylindrical sealing block 126, preferably of Teflon, is located in the chamber 118 adjacent the bearing sleeve 124 and is held in a fixed position by three machine screws 128 extending through the block 126 and threaded into tapped bores in the end wall 120. An O-ring 130 is located at the outer edge of the sealing block 126, in an annular offset 131. The sealing block 126 has an outer annular, planar surface 132 which is polished.

A second sealing block 134 is located contiguous to the block 126 and also has an annular polished surface 136 in contact with the surface 132 of the block 126. Whereas the block 126 is stationary, the block 134 rotates with the drive shaft 114, the block 134 having a close fit on the shaft and having an offset 138 containing an O-ring 140 which engages the shaft. The block 134 has three threaded bores 142 therein which receive threaded ends of guide rods 144. The guide rods extend through a thrust washer 146 which is held against the sealing block 136 by lock nuts 148. The ends of the guide rods 144 opposite the threaded ends are slideably received in bores 150 in a guide collar 152. The guide collar 152 is split and is clamped on the drive shaft 114 by a transverse fastener 154. The thrust collar also has a recess which receives an end of a spring 156 with the other end bearing against the thrust washer 146. The spring 156 causes the second sealing block 134 to bear against the first sealing block 126 to assure a liquid-tight seal therebetween. At the same time, the guide rods 144, rotating with the collar 152, assure that the second sealing block 134 will rotate with the shaft 114 and not slip relative thereto, which could soon result in leakage around the O-ring 140.

The support has a further offset 158 which receives a ball bearing 160 to provide further rotatable support for the drive shaft 114. The outer race of the ball bearing 160 is held in the offset 158 and the inner race bears against an annular projection 162 of the collar 152. Finally, an outer split thrust collar 164 is clamped on the drive shaft 114 through a suitable transverse fastener 166. The collar 164 has an annular projection 168 which also bears against the inner race of the ball bearing 160, on the side opposite the annular projection 162 of the collar 152.

An end cap 170 is affixed to an end of the support 16 by a plurality of suitable cap screws 172. The cap 170 has a central bore 174 through which the shaft 114 extends with an annular groove 176 containing an O-ring 178. The cap also has an annular projection 180 which clamps the outer race of the ball bearing 160 against a shoulder forming the offset 158.

An end cap 182 is similar to the end cap 170 except for the bore 174 and the groove 176. The end cap 182 can be removed to check the revolutions per minute of the drive shaft 114 by means of a tachometer. If desired, a threaded plug can be mounted in the cap and readily removed to enable insertion of a tachometer.

The supports 16 and 18 can be affixed to the housing 12 and specifically on the flanges 30 by cap screws 184, with suitable gaskets therebetween. Locating pins 186 are also preferably employed at the lower portions of the housing and supports. While fewer are shown, preferably twelve of the cap screws 184 and eight of the cap screws 172 are employed.

While reference has been made in some instances to upper and lower portions of components of the pump, this is only in reference to the position in which the pump is shown in the drawings. From an operational standpoint, the pump can operate in any position. The pump, as mentioned before, is compact and efficient. For a given size, the pump will pump approximately one-fourth to one-third more per unit of time than pumps on the market. For example, a pump of a given size will pump 100 gallons per minute at 650 rpm compared to 75-80 gallons per minute at the same speed for present commercially-available pumps.

I claim:

1. A rotary pump comprising a housing having a substantially symmetrical shape about a center line thereof and forming an elliptical pumping chamber having its center on the center line, a first liquid passage formed in said housing, said first passage communicating with said chamber and extending to an outside surface of said housing, a second liquid passage formed in said housing, said second passage communicating with said chamber and extending to an outside surface of said housing, bypass passage means formed in said housing, said passage means communicating with said first and second passages and extending around said chamber, a bypass valve assembly including a valve and a valve seat communicating with said bypass passage means, said housing forming a valve chamber symmetrical with the housing center line and communicating with said bypass passage means, said valve seat being formed by a valve seat rod carried by said housing on the center line of said housing, said valve being of cylindrical shape and moveable in said valve chamber on the side of said valve seat rod opposite said pumping chamber, and spring means in said valve chamber urging said valve toward said valve seat rod, a rotor in said pumping chamber, a drive shaft affixed to said rotor, being located on the housing center line, and extending outwardly beyond both ends of said pumping chamber, bearing and sealing means supported by said housing and rotatably supporting said drive shaft, and vanes carried by said rotor and contacting the wall of said pumping chamber.

2. A rotary pump according to claim 1 characterized by adjustable means in said valve chamber and accessible outside said housing for adjusting the force of said spring on said valve.

3. A rotary pump according to claim 1 characterized by said bearing and sealing means each comprising a support affixed to said housing, a sealing block with a planar surface perpendicular to said drive shaft and affixed to said support, a second sealing block mounted on said drive shaft and having a planar surface perpendicular to said drive shaft and positioned contiguous with the planar surface of said first sealing block, and means mounted on the drive shaft for urging said second sealing block toward said first sealing block.

4. A rotary pump according to claim 3 characterized further by said urging means comprising a collar affixed to the drive shaft, and a plurality of guide pins carried by said collar and extending into bores in said second sealing block.

5. A rotary pump for pumping liquids, said pump having a substantially symmetrical shape about a center line thereof, said pump comprising means forming a pumping chamber having its center on the center line, means forming a first liquid passage communicating with said chamber, means forming a second liquid passage communicating with said chamber, bypass passage means communicating with said first and second passages and extending around said chamber, and being substantially symmetrical with respect to the center line, a bypass valve assembly including a valve and a valve seat communicating with said bypass passage means, said valve seat being formed by a valve seat rod extending across said bypass passage means on the center line of said pump, said valve being of cylindrical shape and having substantially equal areas exposed to said bypass means on each side of said valve seat rod, whereby said valve will open under substantially equal liquid pressures regardless of the direction in which liquid is being pumped through said pumping chamber, a rotor in said pumping chamber, a drive shaft affixed to said rotor and located on the center line, said drive shaft extending outwardly beyond the ends of said pumping chamber, bearing and sealing means rotatably supporting said drive shaft, and vanes carried by said rotor and contacting the walls of said pumping chamber.

6. A rotary pump according to claim 5 characterized by spring means urging said valve towards said valve seat rod and adjustable means for adjusting the force of said spring on said valve.

7. A rotary pump according to claim 5 characterized by said bearing and sealing means each comprising a sealing block with a planar surface perpendicular to said drive shaft, a second sealing block mounted on said drive shaft and having a planar surface perpendicular to said drive shaft and positioned contiguous with the planar surface of said first sealing block, and means mounted on said drive shaft for urging said second sealing block toward said first sealing block.

8. A rotary pump according to claim 7 characterized further by said urging means comprising a collar affixed to the drive shaft, and a plurality of guide pins carried by said collar and extending into bores in said sealing block.

9. A rotary pump according to claim 5 characterized by said rotor having a plurality of longitudinally-extending, radially-disposed grooves, each of said rotor grooves having recesses, one of said vanes being carried in each of said grooves, each of said vanes having a plurality of recesses extending into the vanes from an inner edge positioned in the rotor groove, each of said rotor grooves having recesses positioned in alignment with the vane recesses, and springs extending into said groove recesses and urging the vanes radially outwardly.

10. A rotary pump according to claim 9 characterized by outer edges of said vanes having slanted side surfaces terminating in a longitudinally-extending flat central strip.

11. A rotary pump according to claim 9 characterized by a pin extending through a substantial portion of the length of each of said springs and having an enlarged head received in the corresponding groove recess.

* * * * *

UNITED STATES PATENT OFFICE
CERTIFICATE OF CORRECTION

PATENT NO. : 4,251,192
DATED : February 17, 1981
INVENTOR(S) : Alonzo Robert Clark It is certified that error appears in the above-identified patent and that said Letters Patent are hereby corrected as shown below:

In Column 6, line 32, before "sealing", insert

--second--.

Signed and Sealed this

Nineteenth Day of May 1981

[SEAL]

Attest:

RENE D. TEGTMEYER

Attesting Officer

Acting Commissioner of Patents and Trademarks